United States Patent [19]
Yoshida

[11] Patent Number: 5,982,504
[45] Date of Patent: *Nov. 9, 1999

[54] COMMUNICATION APPARATUS FOR SORTING SHEETS IN ACCORDANCE WITH DETECTED CALLING SIGNALS

[75] Inventor: Takehiro Yoshida, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/865,046

[22] Filed: May 29, 1997

Related U.S. Application Data

[63] Continuation of application No. 08/382,201, Feb. 1, 1995.

[30] Foreign Application Priority Data

Feb. 2, 1994 [JP] Japan .................................. 6-030958

[51] Int. Cl.$^6$ .................................................. H04N 1/32
[52] U.S. Cl. .......................... 358/402; 358/434; 358/438; 358/440; 358/468
[58] Field of Search ...................................... 358/402, 407, 358/434, 440, 435, 436, 438, 439, 468, 444; 379/373, 100.12, 100.15, 100.16, 375; 271/279, 287, 288, 289, 292, 296, 298; 270/58.01, 58.08

[56] References Cited

U.S. PATENT DOCUMENTS

| | | |
|---|---|---|
| 4,729,033 | 3/1988 | Yoshida . |
| 4,814,894 | 3/1989 | Yoshida . |
| 4,815,121 | 3/1989 | Yoshida . |
| 4,823,375 | 4/1989 | Yoshida . |
| 4,998,273 | 3/1991 | Nichols ................................... 379/373 |
| 5,103,318 | 4/1992 | Takaoka ................................. 358/444 |
| 5,307,179 | 4/1994 | Yoshida . |
| 5,308,058 | 5/1994 | Mandel et al. .......................... 271/289 |
| 5,333,190 | 7/1994 | Eyster ..................................... 379/375 |
| 5,342,034 | 8/1994 | Mandel et al. ....................... 270/58.08 |
| 5,358,238 | 10/1994 | Mandel et al. .......................... 271/298 |
| 5,361,296 | 11/1994 | Reyes et al. ............................ 379/373 |
| 5,390,910 | 2/1995 | Mandel et al. .......................... 271/296 |
| 5,435,544 | 7/1995 | Mandel et al. .......................... 271/298 |

*Primary Examiner*—Scott Rogers
*Attorney, Agent, or Firm*—Fitzpatrick, Cella, Harper & Scinto

[57] ABSTRACT

A facsimile apparatus includes a control circuit. The control circuit performs control for switching between sorter bins (n), control for changing receiving terminal information consisting of a telephone number and abbreviated name of a receiver in accordance with a calling signal, control for changing a received information output method in accordance with a calling signal, and control for selecting one of a first use condition for a plurality of users and a second use condition for a single user. The first operation mode is defined by the switching control for the sorter bins (n) and change control for the receiving terminal information. This first operation mode is executed when the first use condition is selected. The second operation mode is defined by the change control for the received information output method. This second operation mode is executed when the second use condition is selected.

4 Claims, 9 Drawing Sheets

| FIG. 1A | FIG. 1B |

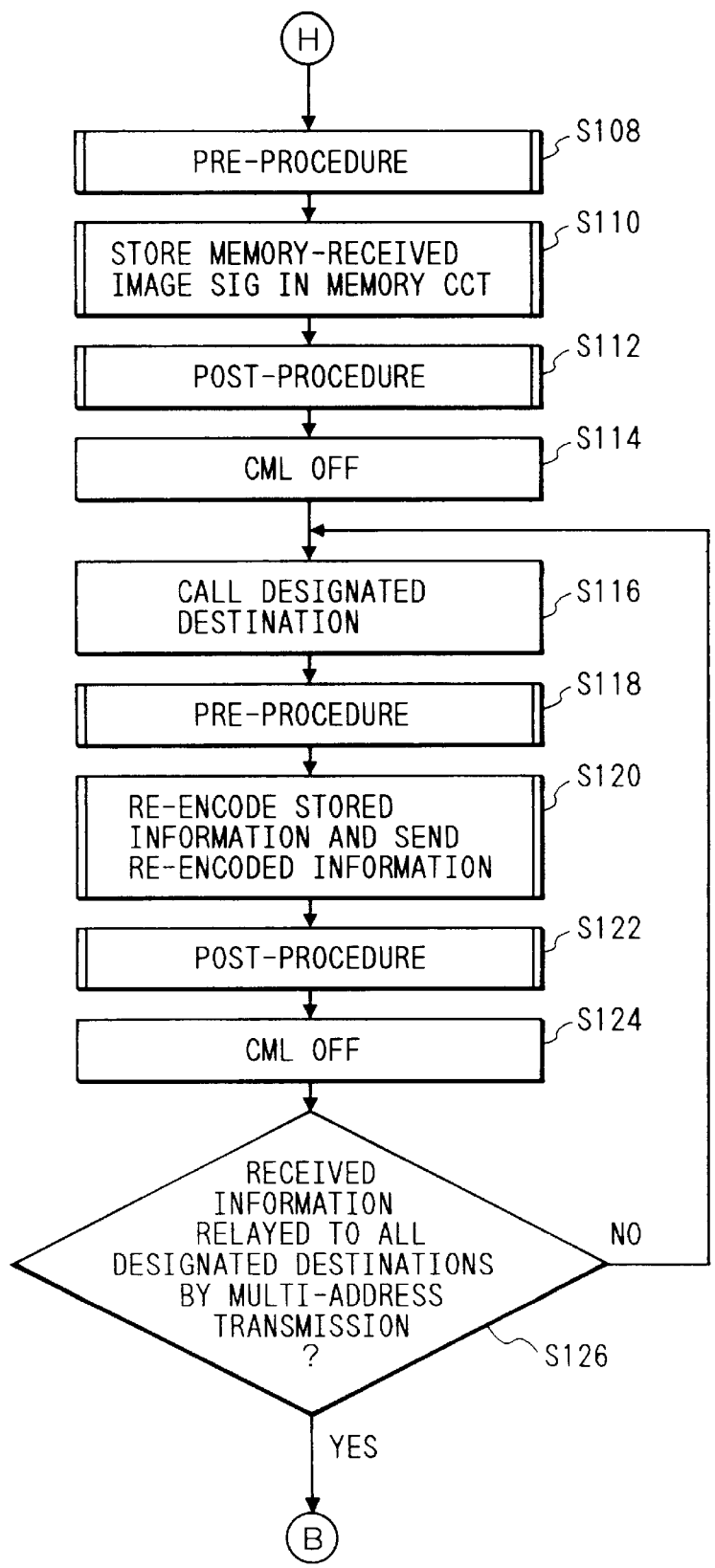

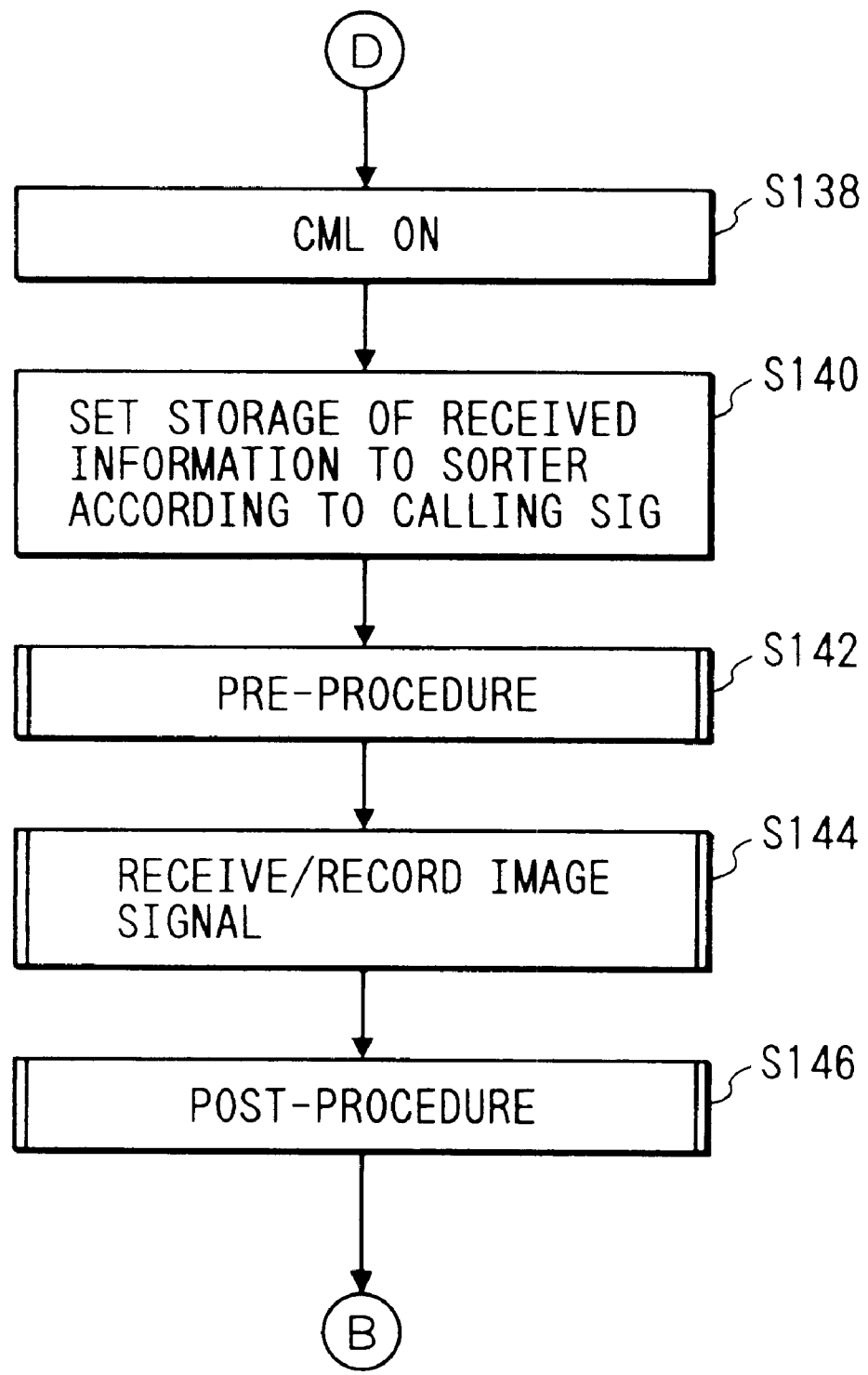

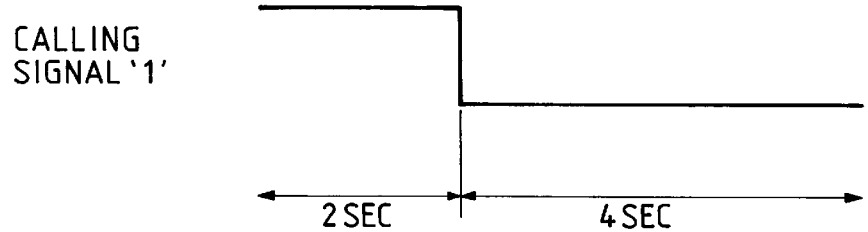
FIG. 8A  CALLING SIGNAL '1'
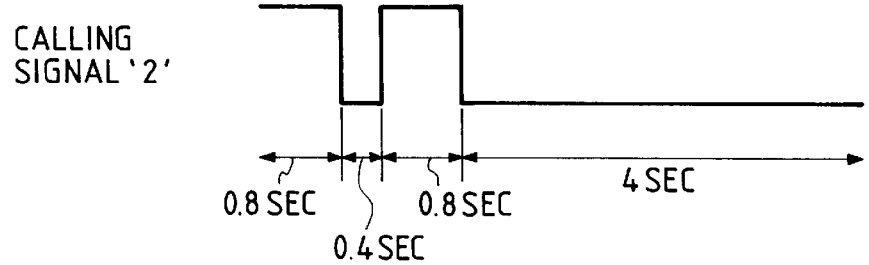
FIG. 8B  CALLING SIGNAL '2'
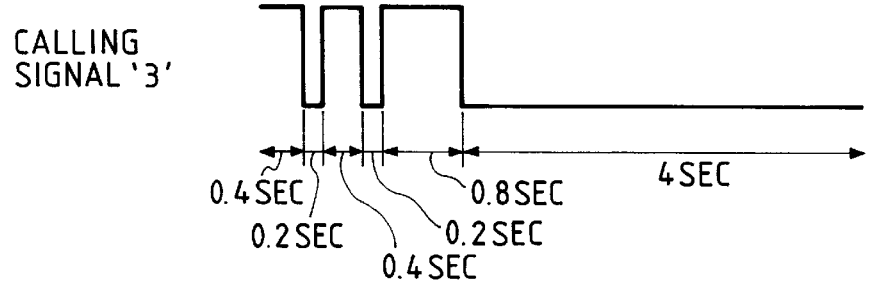
FIG. 8C  CALLING SIGNAL '3'
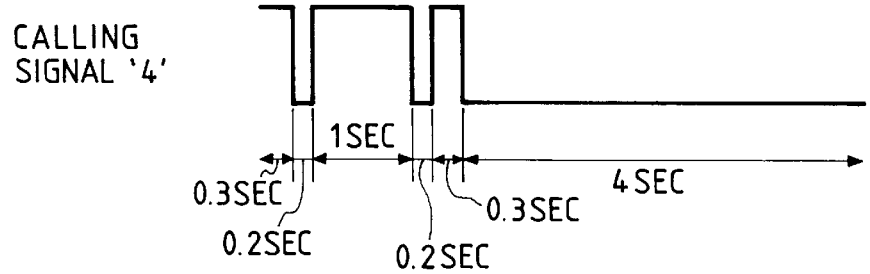
FIG. 8D  CALLING SIGNAL '4'
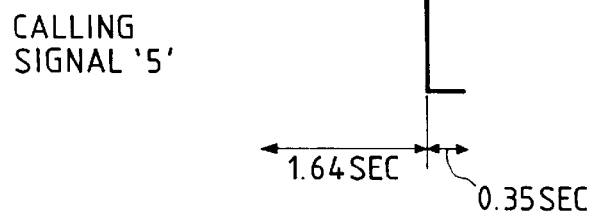
FIG. 8E  CALLING SIGNAL '5'

COMMUNICATION APPARATUS FOR SORTING SHEETS IN ACCORDANCE WITH DETECTED CALLING SIGNALS

This application is a continuation of application Ser. No. 08/382,201 filed Feb. 1, 1995.

BACKGROUND OF THE INVENTION

1. Field of the Invention

The present invention relates to a facsimile apparatus and, more particularly, to a facsimile apparatus capable of detecting a plurality of calling signals.

2. Related Background Art

A conventional facsimile apparatus capable of detecting a plurality of calling signals has an incoming call switching mode for selecting one of automatic and manual reception modes in accordance with a calling signal.

For example, when a calling signal is sent from a calling terminal as a non-speech terminal to a called terminal having an incoming call switching mode, the called terminal automatically receives the calling signal or connects a facsimile terminal to a line and sends a CED signal (called terminal identification signal) 1.8 to 2.5 seconds after the connection of the facsimile terminal.

On the other hand, when a call is made from a calling terminal as a speech terminal to the called terminal, the called terminal calls an operator, and the operator performs a manual operation so that the called operator makes conversation with an operator of the calling terminal. The called operator performs an operation to cause the called terminal to switch the line to a facsimile side and then send a CED signal.

In the conventional facsimile apparatus capable of detecting a plurality of calling signals, only the incoming call switching mode is executed in accordance with a type of the detected calling signal. For this reason, the calling signal cannot be efficiently utilized, and hence effective utilization of the apparatus using detection of the calling signal cannot be sufficiently realized.

SUMMARY OF THE INVENTION

It is an object of the present invention to improve a facsimile apparatus.

It is another object of the present invention to provide a facsimile apparatus which can be efficiently utilized for many purposes in accordance with a plurality of calling signals.

BRIEF DESCRIPTION OF THE DRAWINGS

FIG. 6 is a flow chart for explaining still another operation of a control circuit in the facsimile apparatus shown in FIGS. 1A and 1B;

FIG. 7 is a flow chart for explaining still another operation of a control circuit in the facsimile apparatus shown in FIGS. 1A and 1B; and FIGS. 8A to 8E are timing charts showing the waveforms of calling signals received by the facsimile apparatus shown in FIGS. 1A and 1B.

DETAILED DESCRIPTION OF THE PREFERRED EMBODIMENT

The preferred embodiment of the present invention will be described with reference to the accompanying drawings.

Figures 1, 1A:
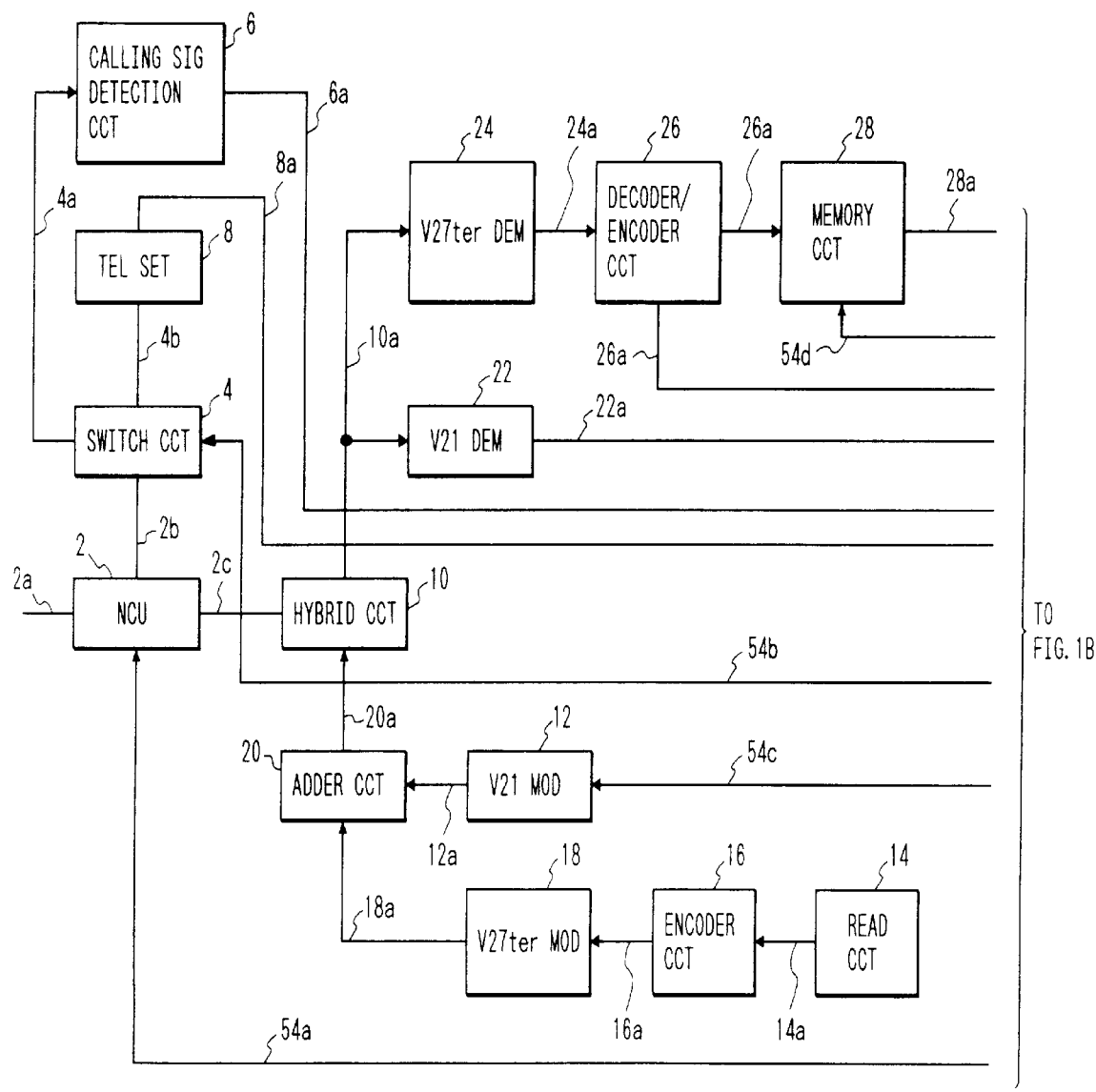
FIG. 1 is comprised of FIGS. 1A and 1B are block diagrams showing an arrangement of a facsimile apparatus according to an embodiment of the present invention.
Figure 1B:
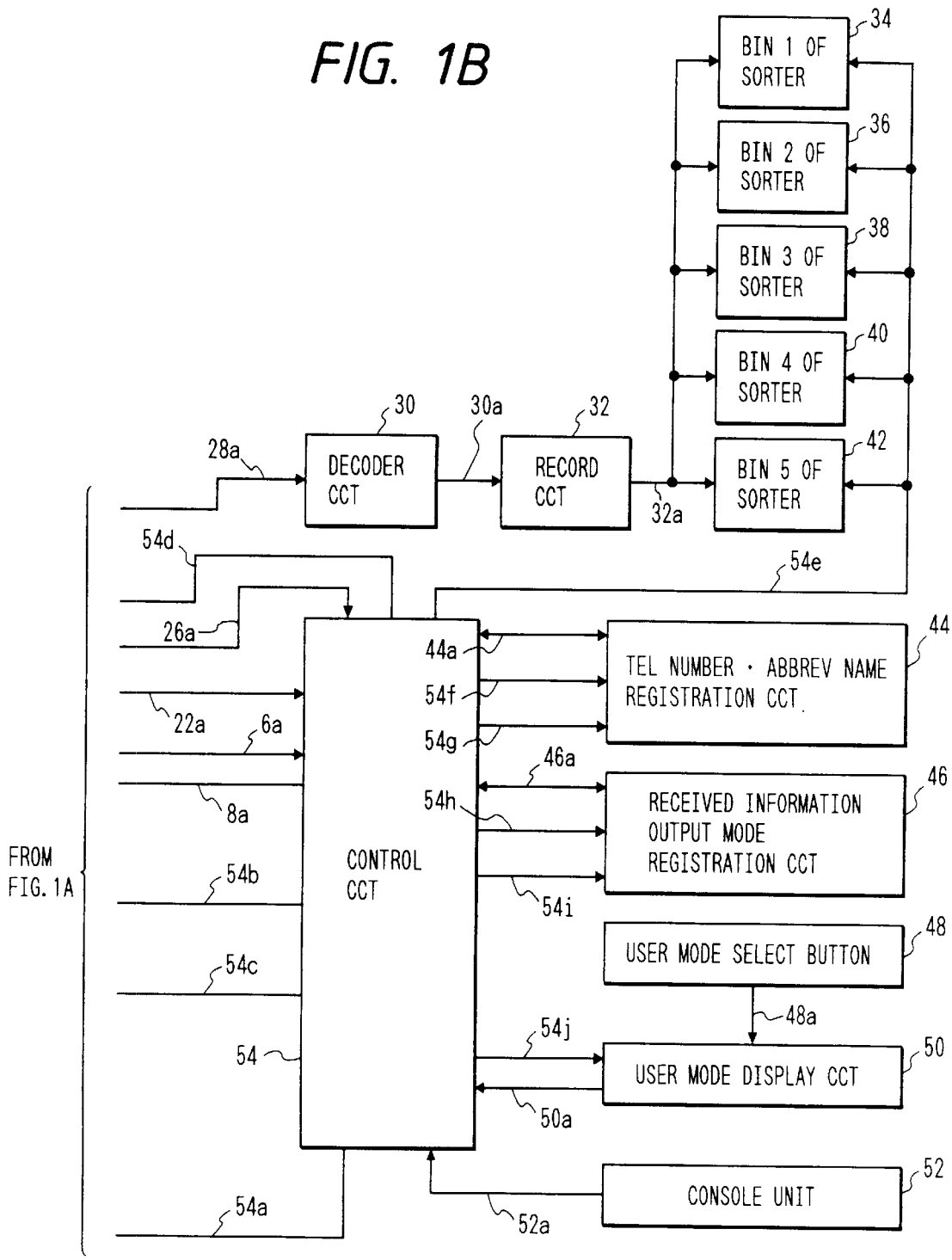

FIGS. 1A and 1B are block diagrams showing the arrangement of a facsimile apparatus according to an embodiment of the present invention. FIGS. 8A to 8E are timing charts showing the waveforms of calling signals received by the facsimile apparatus shown in FIGS. 1A and 1B.

The facsimile apparatus comprises a network control unit (to be referred to as an NCU hereinafter) 2 connected to a telephone line 2a. The NCU 2 performs telephone switching network connection control such as connection of a telephone network to a line terminal so as to perform data communication, switching to a data communication line, and selective switching between connection between the telephone line 2a and a telephone set 8 through a switch circuit 4, and connection between the telephone line 2a and a hybrid circuit 10. The NCU 2 is connected to the switch circuit 4 through a signal line 2b, and the switch circuit 4 and the telephone set 8 are connected through a signal line 4b. The NCU 2 and the hybrid circuit 10 are connected through a signal line 2c.

The switching operations of the NCU 2 are controlled by a control circuit 54. When a control signal output through a signal line 54a is set at "0", the telephone line 2a is connected to the switch circuit 4. However, when the control signal is set at "1", the telephone line 2a is connected to the hybrid circuit 10.

When a signal output from the control circuit 54 through a signal line 54b is set at "0", the switch circuit 4 connects the signal line 2b to the signal line 4b. That is, the NCU 2 is connected to the telephone set 8. However, when the signal output through the signal line 54b is set at "1", the signal line 2b is connected to a signal line 4a. That is, the NCU 2 is connected to a calling signal detection circuit 6.

The calling signal detection circuit 6 detects five calling signals having different numbers of "1", "2", "3", "4", and "5". The respective calling signals comprise pulse signals having different time widths, as shown in FIGS. 8A to 8E. For example, the calling signal having the number of "1" is a pulse signal having a continuous time width of 2 seconds. When any calling signal is not detected, a signal of "0" is output to the control circuit 54 through a signal line 6a. When any one of the calling signals is detected, a signal representing the value of the detected signal is output to the control circuit 54 through the signal line 6a. For example, when the calling signal having the number of "1" is detected, a signal of "1" is output through the signal line 6a.

The telephone set 8 is connected to the control circuit 54 through a signal line 8a.

The hybrid circuit 10 separates a signal transmitted from a transmission system through the telephone line 2a from a signal received by a receiving system through the telephone line 2a.

The transmission system comprises a read circuit 14 constituted by an optical system and an image pickup element such as a CCD. The read circuit 14 sequentially reads a one-line image from a transmission original in the main scanning direction and generates binary signals of white and black corresponding to the read image. The binary signal from the read circuit 14 is supplied to an encoder circuit 16 through a signal line 14a.

The encoder circuit 16 encodes the input binary signal and outputs the encoded signal to a signal line 16a. The encoding scheme is modified Huffman coding (MH coding) or modified READ coding (MR coding).

The encoded signal from the encoder circuit 16 is supplied to a V27 ter modulator 18. The V27 ter modulator 18 modulates the encoded signal to generate a modulated signal. This modulation processing is performed using differential phase modulation based on the CCITT (International Consulative Committee for Telephone and Telegraph) Recommendation V27 ter. However, quadrature modulation based on the Recommendation V29 may be used in place of differential phase modulation.

The modulated signal from the V27 ter modulator 18 is supplied to an adder circuit 20 through a signal line 18a.

The adder circuit 20 adds a modulated signal output from a V21 modulator 12 through a signal line 12a and the modulated signal from the V27 ter modulator 18 and outputs the sum signal as a transmission signal to the hybrid circuit 10 through a signal line 20a. The V21 modulator 12 modulates a procedure signal output from the control circuit 54 through a signal line 54c, thereby generating the modulated signal. This modulation processing is performed based on the CCITT Recommendation V21.

On the other hand, the receiving system comprises a V21 demodulator 22 and a V27 ter demodulator 24. The V21 demodulator demodulates the signal received from the hybrid circuit 10 on the basis of the CCITT Recommendation V21 to generate the procedure signal. This procedure signal is supplied to the control circuit 54 through a signal line 22a.

The V27 ter demodulator 24 demodulates the signal received from the hybrid circuit 10 to generate a demodulated signal. This demodulation processing is performed on the basis of the CCITT Recommendation V27 ter, but may be performed on the basis of the Recommendation V29 instead.

The demodulated signal output from the V27 ter demodulator 24 through a signal line 24a is supplied to a decoder/encoder circuit 26. The decoder/encoder circuit 26 decodes the demodulated signal and performs k=8 MR encoding of the demodulated signal again. The decoded signal is supplied to the control circuit 54 through a signal line 26a. The encoded signal of k=8 is supplied to a memory circuit 28 through a signal line 26b.

The memory circuit 28 stores the MR-encoded signal. This encoded signal is read out on the basis of a signal output from the control circuit 54 through a signal line 54d.

The encoded signal read out from the memory circuit 28 is supplied to a decoder circuit 30 through a signal line 28a. The decoder circuit 30 decodes the encoded signal and supplies the decoded signal to a record circuit 32.

The record circuit 32 receives the decoded signal from the decoder circuit 30 and sequentially records this signal on a recording sheet every line.

The recording sheet on which information is recorded by the record circuit 32 is supplied to one of a plurality of bins (or steps) (n=1, . . . , 5) 34, 36, 38, 40, and 42 of a sorter through a convey path 32a. When a signal of "1" is output from the control circuit 54 to a signal line 54e, the recording sheet is stored in the bin (1) 34 of the sorter. Similarly, when signals of "2", "13", "4", and "5" are output to the signal line 54e, the recording sheets are stored in the bin (2) 36, the bin (3) 38, the bin (4) 40, and the bin (5) 42 of the sorter, respectively.

In addition to control for the memory circuit 28 and control for switching between sorter bins (n), the control circuit 54 performs control for changing receiving terminal information consisting of a telephone number, an abbreviated name of a user or receiver in accordance with a calling signal, control for changing a received information output mode corresponding to each calling signal, and control for selecting one of the first use condition for setting a plurality of users and the second use condition for setting a single user.

The first operation mode is defined in accordance with control for switching between the sorter bins (n) and control for changing the receiving terminal information such as the telephone number and the abbreviated name of a user in accordance with the calling signal. This first operation mode is executed when the first use condition is selected.

The second operation mode is defined by control for changing the received information output mode corresponding to each calling signal. The second operation mode includes a memory-receive mode for storing received information in a memory means, a confidential-receive mode for confidentially storing received information, a relay multi-address receive mode for performing compulsory relay multi-address transmission, a first recording sheet output mode for outputting a recording sheet on which received information is recorded, and a second recording sheet output mode for outputting a plurality of recording sheets on which identical received information is recorded. The second operation mode is executed when the second use condition is selected.

In each control operation described above, a telephone number•abbreviated name registration circuit 44, a received information output mode registration circuit 46, a user mode select button 48, a user mode display circuit 50, and an operation unit 52 are used.

The telephone number•abbreviated name registration circuit 44 is a circuit for registering a telephone number and abbreviated name of a receiver in accordance with a number designated by a calling signal detected by the calling signal detection circuit 6. In registering the telephone number and abbreviated name of the receiver, a calling signal number (e.g., "1" of the numbers "1" to "5"), a space, a telephone number (e.g., 03-3xxx-1xxx) corresponding to this calling signal number, a space, and an abbreviated name (C business company) corresponding to this calling signal number are fetched in the telephone number •abbreviated name registration circuit 44 through a signal line 44a. A write pulse is then output through a signal line 54f. To read out the telephone number and abbreviated name of the receiver from the telephone number•abbreviated name registration circuit 44, after the calling signal number (e.g., "1") is fetched through the signal line 44a, a read pulse is output from the control circuit 54 through a signal line 54g. Registration information corresponding to the calling signal number designated by this read pulse output is read out through the signal line 44a. More specifically, when the calling signal number is "1", "03-3xxx-1xxx" and "C business company" are read out as the telephone number and the abbreviated name, respectively.

The received information output mode registration circuit 46 is a circuit for registering a received information output mode (or method) corresponding to the number designated by the calling signal detected by the calling signal detection circuit 6. To register a received information output mode, after a calling signal number (e.g., "2" of the numbers "1" to "5"), a space, and a data string representing an output mode (or output method) (e.g., "confidential-receive") corresponding to this calling signal number are output through a signal line 46a, a write pulse is output through a signal line 54h. To the contrary, to read out the received information output mode from the received information output mode registration circuit 46, after a calling signal number (e.g., "2") is fetched through the signal line 46a, a read pulse is output from the control circuit 54 through a signal line 54i. The registration information corresponding to the calling signal number designated by this read pulse output is read out through the signal line 46a. More specifically, when the calling signal number is "2", the "confidential-receive" is read out as the received information output mode.

The user mode select button 48 is a button for selecting one of a pattern (or mode) for a plurality of users or a pattern (or mode) for a single user. Upon depression of this button, a pulse signal is generated through a signal line 48a.

The user mode display circuit 50 is a display circuit for displaying whether the current pattern (or mode) is the pattern for the plurality of users or the pattern for the single user. When a clear pulse is output from the control circuit 54 through a signal line 54j, the user mode display circuit 50 displays "available for plural users". Every time a pulse signal is then output through the signal line 48a, the user mode display circuit 50 alternately display "available for single user" and "available for plural users". When the user mode display circuit 50 displays "available for single user", a signal of "0" is output to a signal line 50a. However, when the user mode display circuit 50 displays "available for plural users", a signal of "1" is output through the signal line 50a.

The operation unit (or console unit) 52 has a registration key for registering a telephone number and abbreviated name of a receiver, and a received information output mode, a set key, a start key, a ten-key pad, a one-touch dial key, an abbreviated dial key, and various function keys. When the registration button or each key is depressed, corresponding information is output to the control circuit 54 through a signal line 52a.

The operations of the control circuit 54 in the facsimile apparatus of this embodiment will be described with reference to FIGS. 2 to 7. FIGS. 2 to 7 are flow charts for explaining the operations of the control circuit in the facsimile apparatus shown in FIGS. 1A and 1B.

Figure 2:
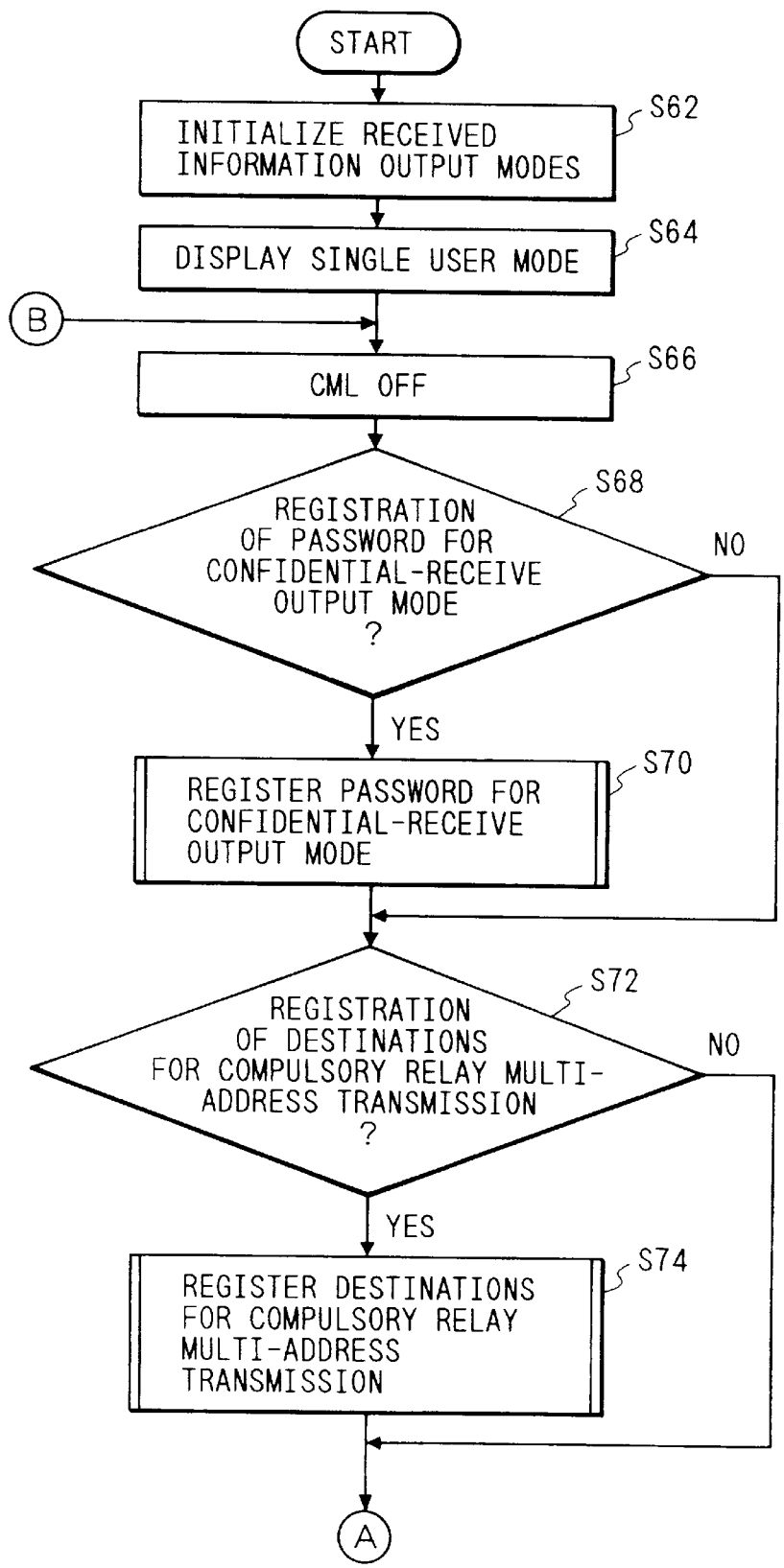
FIG. 2 is a flow chart for explaining an operation of a control circuit in the facsimile apparatus shown in FIGS. 1A and 1B.

Referring to FIG. 2, first of all, step S62 is executed. In step S62, received information output modes are initialized in accordance with calling signals. For example, when a calling signal having the number of "1" is detected, a "first receive for print-out" is selected as the received information output mode. When a calling signal having the number of "2" is detected, the "confidential-receive" is selected. When a calling signal having the number of "3" is detected, the "memory-receive" is selected. When a calling signal having the number of "4" is detected, the "compulsory relay multi-address transmission" is selected. When a calling signal having the number of "5" is detected, a "second-receive for print-out" is selected.

Step S64 is then executed. In step S64, a clear pulse is output through the signal line 54j to cause the user mode display circuit 50 to display the "available for single user".

After the "available for single user" is displayed, step S66 is executed. In step S66, a control signal of "0" is output through the signal line 54a to turn off a CML.

After the CML is turned off, step S68 is executed. In step S68, it is determined whether registration of a password for confidential-receive output is selected. If the registration of the password for confidential-receive output is selected, step S70 is executed; otherwise, the flow advances to step S72.

In step S70, the password for confidential-receive output is registered.

In step S72, it is determined whether registration of destinations for compulsory relay multi-address transmission is selected. When the registration of the destination for compulsory relay multi-address transmission is selected, step S74 is executed; otherwise, the flow advances to step S76 (FIG. 3).

In step S74, the destinations for compulsory relay multi-address transmission are registered.

Figure 3:
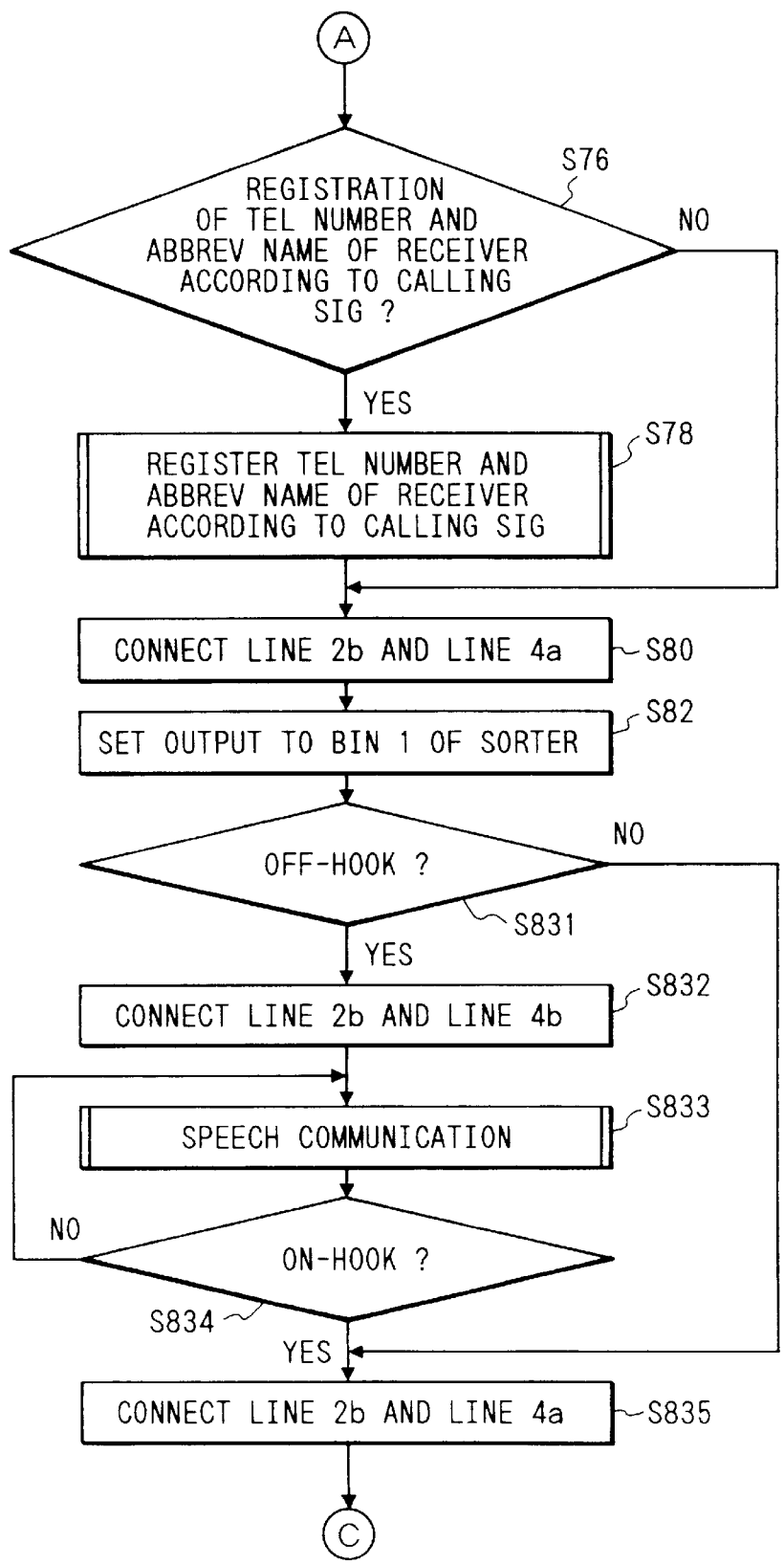
FIG. 3 is a flow chart for explaining another operation of a control circuit in the facsimile apparatus shown in FIGS. 1A and 1B.

In step S76, as shown in FIG. 3, it is determined whether registration of the telephone number and abbreviated name of the receiver is selected. When the registration of the telephone number and abbreviated name of the receiver is selected, step S78 is executed; otherwise, the flow advances to step S80.

In step S78, the telephone number and abbreviated name of the receiver according to the calling signal are registered.

In step S80, a signal of "0" is output to the switch circuit 4 through the signal line 54b to cause the switch circuit 4 to connect the signal line 2b to the signal line 4a.

Step S82 is then executed. In step S82, a signal of "1" is output to the signal line 54e to set recording sheet output to the bin (1) 34 of the sorter.

After the output to the bin (1) 34 of the sorter is set, step S831 is executed. In step S831, it is determined on the basis of information fetched through the signal line 8a whether an off-hook state is set. If YES in step S831, step S832 is executed; otherwise, the flow advances to step S835.

In step S832, a signal of "1" is output through the signal line 54b to cause the switch circuit 4 to connect the signal line 2b to the signal line 4b.

Step S833 is then executed. In step S833, speech communication is performed.

Step S834 is executed. In step S834, it is determined on the basis of information fetched through the signal line 8a whether an on-hook state is set. If YES in step S834, step S835 is executed; otherwise, the processes from step S833 are repeated again.

In step S835, a signal of "0" is output through the signal line 54b to cause the switch circuit 4 to connect the signal line 2b to the signal line 4a.

Figure 4:
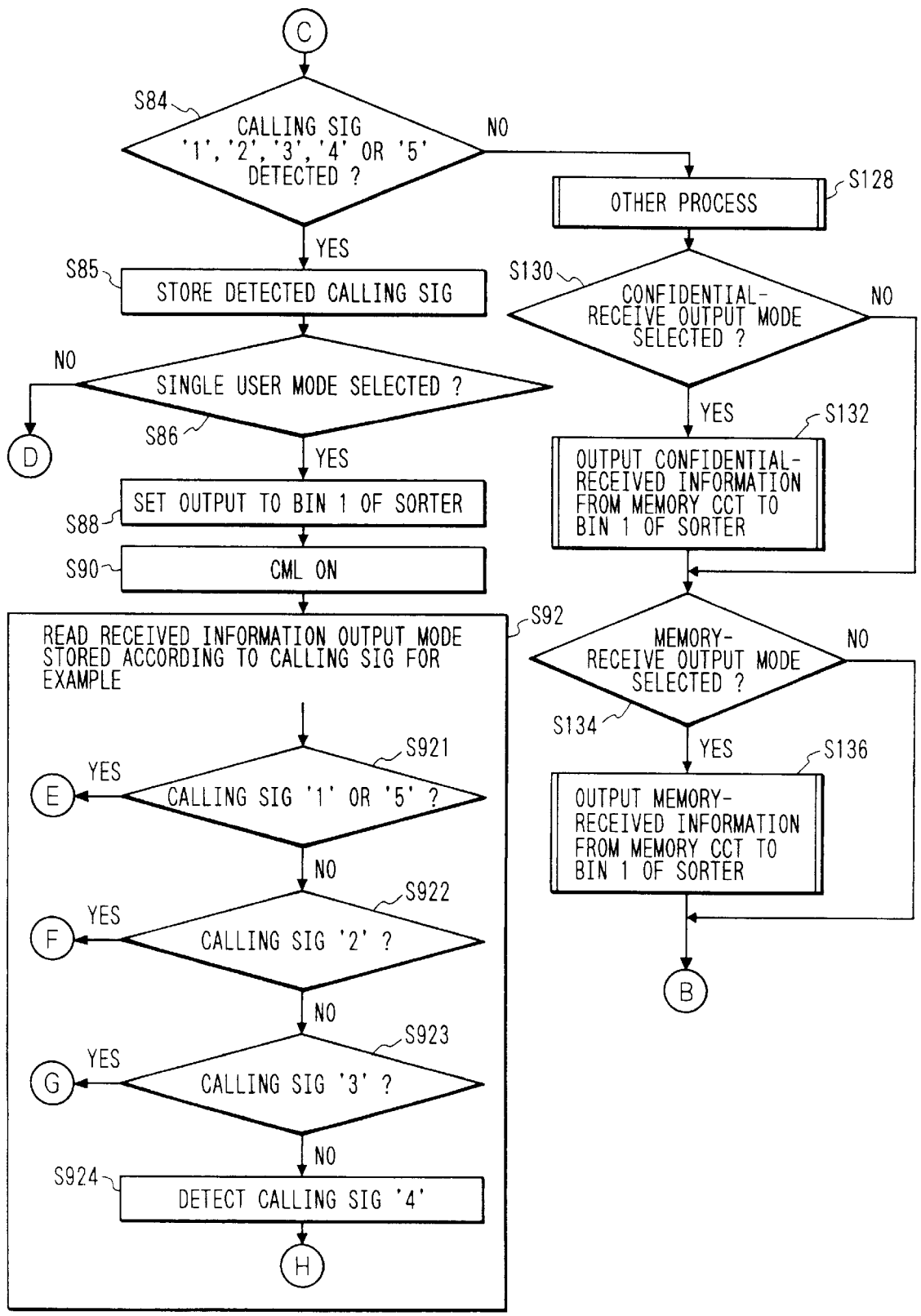
FIG. 4 is a flow chart for explaining still another operation of a control circuit in the facsimile apparatus shown in FIGS. 1A and 1B.

As shown in FIG. 4, step S84 is executed. In step S84, it is determined on the basis of information fetched from the calling signal detection circuit 6 through the signal line 6a whether the calling signal "1", "2", "3", "4", or "5" is detected. If YES in step S84, step S85 is executed; otherwise, the flow advances to step S128.

The detected calling signal is stored in step S85.

Step S86 is then executed. In step S86, it is determined on the basis of a signal fetched from the user mode display circuit 50 through the signal line 50a whether the pattern for the single user is selected. If YES in step S86, step S88 is executed; otherwise, that is, when the pattern for the plurality of users is selected, the flow advances to step S138 (FIG. 7).

In step S88, a signal of "1" is output through the signal line 54e to set recording sheet output to bin (1) 34 of the sorter.

Step S90 is executed. In step S90, a control signal of "1" is output through the signal line 54a to turn on the CML.

After the CML is turned on, step S92 is executed. In step S92, the received information output mode (or method) registered in correspondence with the calling signal number detected by the calling signal detection circuit 6 is read out from the received information output mode registration circuit 46. For example, in light of the initialization as before-mentioned, in read access of this received information output mode, when a calling signal having the number "1" or "5" is detected (step S921), step S94 (FIG. 5) is executed. When a calling signal having the number "2" is detected (step S922), step S100 (FIG. 5) is executed. When a calling signal having the number "3" is detected (step S923), step S104 (FIG. 5) is executed. When a calling signal having the number "4" is detected (step S924), step S108 (FIG. 6) is executed.

Figure 5:
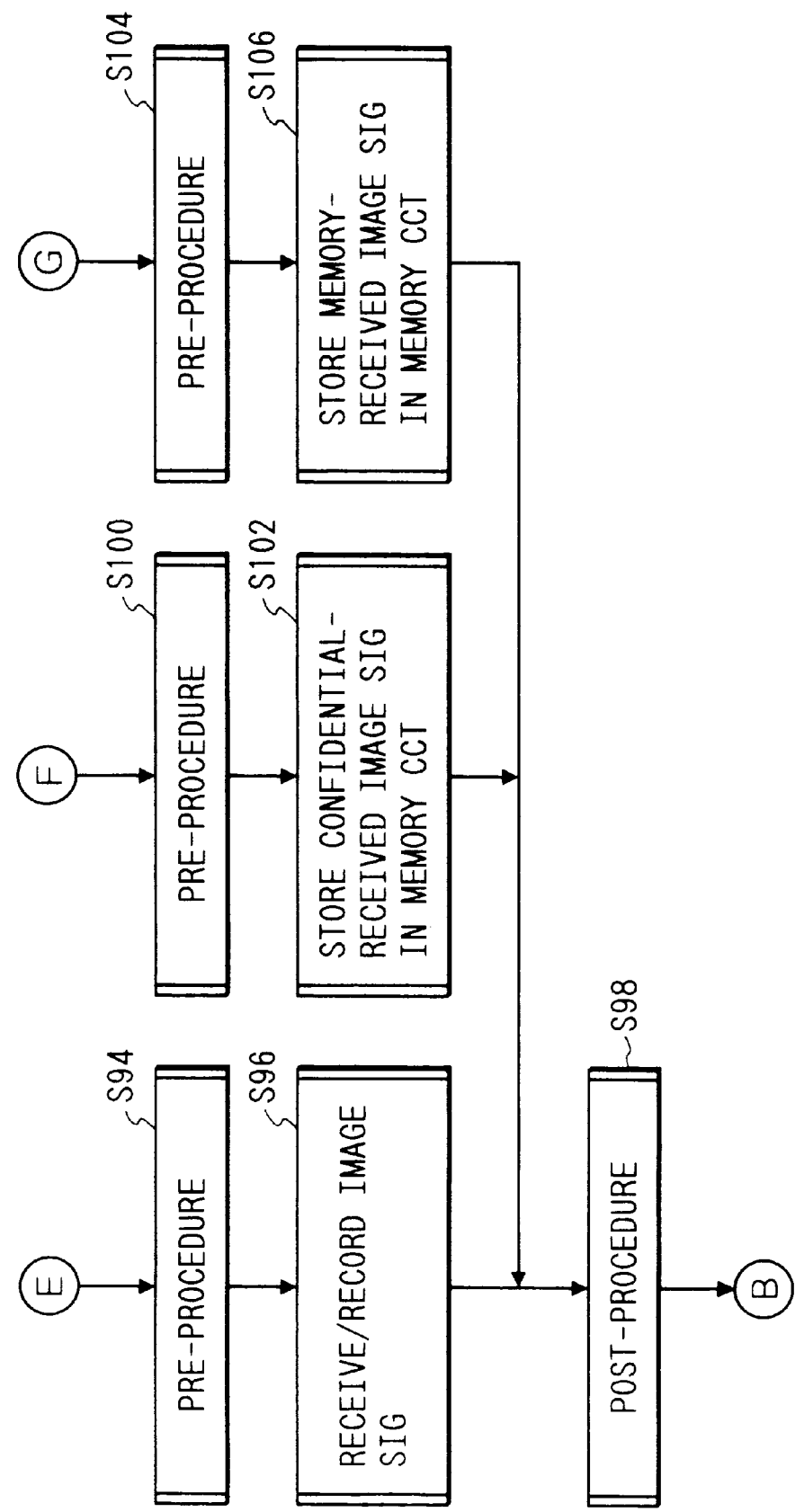
FIG. 5 is a flow chart for explaining still another operation of a control circuit in the facsimile apparatus shown in FIGS. 1A and 1B.

As shown in FIG. 5, a pre-procedure is performed in step S94. In this pre-procedure, information representing the telephone number and the abbreviated name of the receiver stored in correspondence with the calling signal is informed to the destination.

Step S96 is executed. In step S96, the image signal is received/recorded. At the same time, the recording sheet on which information is recorded is output to the bin (1) 34 of the sorter. During this recording, if the calling signal is "1", the "first-receive for print-out mode" is performed to output one recording sheet for one-page received data. When the calling signal is "5", the "second-receive for print-out mode" is performed to output a plurality of recording sheets on which identical information is recorded.

When the image is received/recorded, step S98 is executed. In step S98, a post-procedure is performed.

When the calling signal having the number "2" is detected, a pre-procedure is performed in step S100 as in step S94. In this pre-procedure, information representing the telephone number and the abbreviated name of the receiver stored in correspondence with the calling signal is informed to the destination.

Step S102 is then executed. In step S102, a confidential-received image signal is stored in the memory circuit 28. After the confidential-received image signal is stored in the memory 28, step S98 is executed.

In step S104 executed upon detection of the calling signal having the number "3", a pre-procedure as in step S94 is performed. In this pre-procedure, information representing the telephone number and the abbreviated name of the receiver stored in correspondence with the calling signal is informed to the destination.

Step S106 is then executed. In step S106, a memory-received image signal is stored in the memory circuit 28. After the memory-received image signal is stored in the memory circuit 28, step S98 is executed.

In step S108 executed upon detection of the calling signal having the number "4", a pre-procedure as in step S94 is performed. In this pre-procedure, information representing the telephone number and the abbreviated name of the receiver stored in correspondence with the calling signal is informed to the destination.

Step S110 is then executed. In step S110, a memory-received image signal is stored in the memory circuit 28. After the memory-received image signal is stored in the memory circuit 28, step S112 is executed. In step S112, a post-procedure is performed.

Upon execution of the post-procedure, step S114 is executed. In step S114, a control signal of "0" is output through the signal line 54a to turn off the CML.

Step S116 is then executed. In step S116, a designated destination is called for relay multi-address transmission.

After this calling, step S118 is executed. In step S118, a pre-procedure is executed. In this pre-procedure, information representing the telephone number and the abbreviated name of the receiver stored in correspondence with the calling signal is informed to the destination.

Upon execution of the pre-procedure, step S120 is executed. In step S120, information in the memory circuit 28 is re-encoded, and the re-encoded information is transmitted to the destination.

Step S122 is then executed. In step S122, a post-procedure is executed. Upon completion of the post-procedure, step S124 is executed. In step S124, a signal of "0" is output through the signal line 54a to turn off the CML.

After the CML is turned off, step S126 is executed. In step S126, it is determined whether the received information is relayed to all designated destinations by multi-address transmission. If YES in step S126, the processes from step S66 are repeated. However, if NO in step S126, the processes from step S116 are repeated.

In step S84, when it is determined on the basis of the information fetched from the calling signal detection circuit 6 through the signal line 6a that the calling signal "1", "2", "3", "4"or "5" is not detected, step S128 is executed, as shown in FIG. 4. Other process is performed in step S128.

Step S130 is then executed. In step S130, it is determined whether the confidential-receive output is selected. If YES in step S130, step S132 is executed; otherwise, the flow advances to step S134.

In step S132, the designated confidential-received image signal in the memory circuit 28 is recorded on a recording sheet, and this sheet is output to the bin (1) 34 of the sorter.

Step S134 is then executed. In step S134, it is determined whether a received information output mode of the information from the memory circuit 28 is selected. If YES in step S134, step S136 is executed; otherwise, the processes from step S66 are repeated.

In step S136, the designated received information is read out from the memory circuit 28. This received information is recorded on a recording sheet, and the resultant recording sheet is output to the bin (1) 34 of the sorter. If any calling signal is not detected, step S128 is executed.

If the pattern for the single user is not selected in step S86, i.e., the plurality-of-user mode is selected, a control signal of "1" is output through the signal line 54a in step S138, as shown in FIG. 7, to turn on the CML.

After the CML is turned on, step S140 is executed. In step S140, storage of a recording sheet or received information to a sorter bin corresponding to the calling signal is set.

After storage of the recording sheet or received information to the sorter bin is set, step S142 is executed. In step S142, a pre-procedure is performed. In this pre-procedure, information representing the telephone number and the abbreviated name of the receiver stored in correspondence with the calling signal is informed to the destination.

Step S144 is then executed. In step S144, the image signal is received/recorded. The recording sheet is output to the designated sorter bin.

After the recording sheet is output to the designated sorter bin, step S146 is executed. In step S146, a post-procedure is executed.

As described above, the apparatus can be efficiently used for many purposes in accordance with the types of calling signals. More specifically, the sorter bin (n) is selected in accordance with the calling signal, so that a plurality of users can independently obtain the respective pieces of received information. The apparatus can be efficiently used for many purposes by a plurality of users. In addition, since a received information output mode can be selected in accordance with a calling signal, received information from a specific destination can be output in an optimal form.

When the pattern for the single user is set, a telephone number and abbreviated name of a single user may be stored in another memory, and this information may be transmitted to the destination, in place of informing a destination of the telephone number and abbreviated name which are registered in correspondence with a calling signal.

Information such as a telephone number or an abbreviated number may be assigned to each number of the dial-in function, thereby performing the same control as described above.

When the pattern for plural users is set, print-out terminals may be selected using a LAN (Local Area Network) to change the output designations without changing the sorter bins as the output destinations of the recording sheets.

What is claimed is:

1. A communication apparatus connected to a communication line from which a plurality of calling signals having respective different ringing patterns corresponding to respective ones of a plurality of telephones are received, said apparatus being responsive to receipt of any of the calling signals to establish communication with the communication line, said apparatus comprising:

detecting means for distinguishably detecting the ringing patterns of the calling signals received from the communication line, each ringing pattern of each calling signal having respective identification information associated therewith;

a network control unit for connecting the communication line to, and disconnecting the communication line from, said apparatus;

receiving means for receiving data in association with a received calling signal, said receiving means receiving the data irrespective of the ringing pattern detected for the received calling signal;

recording means for recording the received data on at least one recording sheet;

sorting means having a plurality of bins for sorting recording sheets having data recorded thereon by said recording means; and processing means for storing each ringing pattern detected by said detecting means while the communication line is not connected to said apparatus, for subsequently causing said network control unit to connect the communication line to said apparatus, and for selecting, for each recording sheet having recorded thereon data associated with the received calling signal, which of said bins said sorting means outputs that recording sheet to in accordance with the stored ringing pattern of the received calling signal.

2. A communication method operative in a communication apparatus connected to a communication line from which a plurality of calling signals having respective different ringing patterns corresponding to respective ones of a plurality of telephones are received, the apparatus being responsive to receipt of any of the calling signals to establish communication with the communication line, said method comprising the steps of:

distinguishably detecting the ringing patterns of the calling signals received from the communication line, each ringing pattern of each calling signal having respective identification information associated therewith;

connecting the communication line to, and disconnecting the communication line from, the apparatus using a network control unit;

receiving data in association with a received calling signal, said receiving step receiving the data irrespective of the ringing pattern detected for the received calling signal;

recording the received data on at least one recording sheet;

sorting recording sheets having data recorded thereon by said recording step into a plurality of bins;

storing each ringing pattern detected by said detecting step while the communication line is not connected to the apparatus;

subsequently causing the network control unit to connect the communication line to the apparatus; and selecting, for each recording sheet having recorded thereon data associated with the received calling signal, which of the bins said sorting step outputs that recording sheet to in accordance with the stored ringing pattern of the received calling signal detected in said detecting step.

3. A communication apparatus connected to a communication line from which a plurality of calling signals having respective different ringing patterns corresponding to respective ones of a plurality of telephones are received, said apparatus being responsive to receipt of any of the calling signals to establish communication with the communication line, said apparatus comprising:

detecting means for distinguishably detecting the ringing patterns of the calling signals received from the communication line, each ringing pattern of each calling signal having respective identification information associated therewith;

a network control unit for connecting the communication line to, and disconnecting the communication line from, said apparatus;

receiving means for receiving data in association with a received calling signal, said receiving means receiving the data irrespective of the ringing pattern detected for the received calling signal; and processing means for storing each ringing pattern detected by said detecting means while the communication line is not connected to said apparatus, for subsequently causing said network control unit to connect the communication line to said apparatus, and for processing data associated with the received calling signal, after such data has been received by said receiving means, in accordance with the stored ringing pattern of the received calling signal.

4. A communication method operative in a communication apparatus connected to a communication line from which a plurality of calling signals having respective different ringing patterns corresponding to respective ones of a plurality of telephones are received, the apparatus being responsive to receipt of any of the calling signals to establish communication with the communication line, said method comprising the steps of:

distinguishably detecting the ringing patterns of the calling signals received from the communication line, each ringing pattern of each calling signal having respective identification information associated therewith;

connecting the communication line to, and disconnecting the communication line from, the apparatus using a network control unit;

receiving data in association with a received calling signal, said receiving step receiving the data irrespective of the ringing pattern detected for the received calling signal;

storing each ringing pattern detected by said detecting step while the communication line is not connected to the apparatus;

subsequently causing the network control unit to connect the communication line to the apparatus; and processing data associated with the received calling signal, after such data has been received in said receiving step, in accordance with the stored ringing pattern of the received calling signal.

* * * * *

UNITED STATES PATENT AND TRADEMARK OFFICE
CERTIFICATE OF CORRECTION

PATENT NO. : 5,982,504

DATED : November 9, 1999

INVENTOR(S) : TAKEHIRO YOSHIDA

It is certified that error appears in the above-identified patent and that said Letters Patent is hereby corrected as shown below:

COLUMN 1

Line 52, "1B" should read --1B, which--.

COLUMN 5 line 31, "display" should read --displays--.

Signed and Sealed this

Eleventh Day of July, 2000

Attest:

Q. TODD DICKINSON

*Attesting Officer*              *Director of Patents and Trademarks*